(12) United States Patent
Ready et al.

(10) Patent No.: US 6,474,969 B1
(45) Date of Patent: Nov. 5, 2002

(54) EXTRUSION DIE AND DIE ASSEMBLY FOR UNDERWATER PELLETIZER

(75) Inventors: Kelly Ready, Delta (CA); Antonio Marchet, Burnaby (CA); Jonathan Reinheimer, Surrey (CA)

(73) Assignee: TDS Technologies Inc., Delta (CA)

( * ) Notice: Subject to any disclaimer, the term of this patent is extended or adjusted under 35 U.S.C. 154(b) by 0 days.

(21) Appl. No.: 09/697,129

(22) Filed: Oct. 27, 2000

(51) Int. Cl.[7] .............................. B29B 9/00; B29C 47/12
(52) U.S. Cl. ...................... 425/67; 425/313; 425/379.1; 425/464; 425/DIG. 230
(58) Field of Search ........................ 425/67, 313, 378.1, 425/379.1, 464, DIG. 230; 264/142

(56) References Cited

U.S. PATENT DOCUMENTS

| | | | |
|---|---|---|---|
| 3,973,890 A | 8/1976 | Porter et al. | |
| 4,123,207 A | 10/1978 | Dudley | |
| 4,187,067 A | * 2/1980 | Mizuno et al. | ............. 264/142 |
| 4,621,996 A | 11/1986 | Hundley, III | |
| 4,830,595 A | * 5/1989 | Bentivoglio et al. | ........ 219/201 |
| 5,215,763 A | * 6/1993 | Mattera | ...................... 264/142 |
| 5,403,176 A | 4/1995 | Bruckmann et al. | |
| 5,599,562 A | 2/1997 | Harris et al. | |
| 5,624,688 A | * 4/1997 | Adams et al. | ............. 425/196 |
| 5,629,028 A | 5/1997 | Trumbull | |
| 5,714,173 A | * 2/1998 | Matsuo | ....................... 425/313 |

OTHER PUBLICATIONS

Gala Industries, Inc. brochures. No date.

* cited by examiner

Primary Examiner—Jan H. Silbaugh
Assistant Examiner—Donald Heckenberg
(74) Attorney, Agent, or Firm—Oyen Wiggs Green & Mutala

(57) ABSTRACT

A die and a die assembly are disclosed for use in association with an underwater pelletizer. The die has unique coiled heating elements which allow for uniform heating of the extrusion orifices which pass through the die, reducing or eliminating polymer solidification within the die, thereby allowing the manufacture of uniform pellets of a specific geometry. The heating elements are contained within the die plate of the die, and in a preferred embodiment occupy annular grooves formed therein which are concentric with the extrusion orifice pattern. The die assembly includes thermally-insulating adaptors and gaskets which cover the annular grooves containing the heating elements.

11 Claims, 5 Drawing Sheets

EXTRUSION DIE AND DIE ASSEMBLY FOR UNDERWATER PELLETIZER

TECHNICAL FIELD

The present invention relates to underwater pelletizers, and more particularly to an improved extrusion die and die assembly for use in an underwater pelletizer.

BACKGROUND

Pelletizers have been known and used for a number of years. They are used to process rubber compounds, and molten thermoplastics and other polymers into pellets, which may in turn be used in other processes to manufacture various plastic materials.

In an underwater pelletizer, molten plastic is typically extruded through orifices in a die, forming continuous strands which are cut by knives at the die's cutting face. The cutting takes place underwater in a water chamber or housing. Plastic pellets are formed which cool and harden in the water contained in the water chamber. Typically, the water in the water chamber is much cooler than the molten polymer, allowing very quick cooling of the polymer and quick solidification of the pellets.

Typically, an underwater pelletizer is constructed so that a constant stream of water passes over the die's cutting face, conveying the hardened pellets along to equipment which separates out the pellets from the water and dries them.

It is very important that the pellets formed by such a pelletizing process be uniform in size and shape, and that they be made to a specific geometry. There are, however, a number of difficulties which may be encountered in trying to form uniform pellets.

To form uniform pellets of a specific geometry, the orifices in the extrusion die must remain free and clear of solidified polymer material. If partially plugged, an orifice will allow only a small or irregular strand of polymer through it; this leads to small, irregularly-shaped pellets. If an orifice is completely clogged, of course, no polymer may pass through it, and no pellets are formed, decreasing production of the pelletizer.

The rate of solidification of a polymer exiting an extrusion die in an underwater pelletizer depends upon the nature of the polymer and also on the temperature of the water in the water chamber and the speed of its flow. For any particular polymer, of course, the rate of solidification will depend mostly upon the water temperature. For some polymers, the water temperature must remain fairly cool to cause the polymer to solidify quickly. However, the die plate must not be allowed to become so cooled by the passing water that the polymer solidifies before it has exited the extrusion orifices.

In respect of other polymers, a very hot water temperature is required to keep the polymer from solidifying before exiting the extrusion orifices. Of course, high water temperatures can be hazardous if the water chamber bursts or otherwise leaks.

Rather than attempting to controlling solidification of polymer material merely by adjusting water temperatures, the die plates in underwater pelletizers are typically heated. Past efforts at heating pelletizer dies have focussed upon heating of the die plate by steam or hot oil, as shown in U.S. Pat. No. 4,123,207, which issued in 1978. Such steam and oil-heated die plates are costly, complicated, and require the addition to the pelletizer of a separate complicated system for heating the steam or oil. They are also hazardous.

Other die plates aimed at solving the problem of orifice clogging have employed complicated "sealed heat transfer tubes", as shown in U.S. Pat. No. 5,629,028. These tubes allegedly transfer heat from the molten polymer to the die. They are problematic since they are difficult to adjust for different polymers, which, as noted above, have different properties.

Still other prior art die plates are heated by inserting electric heating rods radially into chambers formed around their circumference, as shown in U.S. Pat. Nos. 4,621,996 and 5,403,176. At least one of the drawbacks of these systems is that the heat is concentrated at a limited number of points on one side of the die hole pattern, and not around the entirety of each of the orifices. To heat the portion of the orifice furthest away from the heating rod enough to prevent clogging, one might increase the heat in the heating rods, but this can cause polymer degradation nearest the heating rod.

There remains, accordingly, a need for an improved extrusion die having a heating system which provides better heating to the extrusion orifices, and to the entirety of each of them, without being of such complicated construction nor as dangerous as currently-employed systems.

SUMMARY OF THE INVENTION

The present invention is an extrusion die, and die assembly, for use in an underwater pelletizer. More particularly, the die preferably comprises a die plate having an upstream extruder face and a downstream cutting face, an inner annular groove formed in one face of the die plate, an outer annular groove formed in one face of the die plate, a plurality of spaced-apart extrusion orifices extending through the die plate from the extruder face to the cutting face, the orifices arranged in a pattern occupying a space between the inner and outer annular grooves and a coiled heating element contained within each of the inner and outer annular grooves, the coiled heating elements having leads extending outwardly from the die plate for connection to an electrical source.

In one embodiment of the invention, the pattern of extrusion orifices is a circular pattern, and the inner and outer annular grooves and the circular pattern of extrusion orifices are all concentric. In another embodiment, all are coaxial with the central axis of the die plate.

A thermally-conductive paste may be contained within each of the inner and outer annular grooves, occupying the volume not occupied by the heating coils, to assist heat transfer. Also assisting heating of the die are a plurality of electrical heating rods occupying chambers arranged radially in the die plate, the chambers extending inwardly from the circumference of the die plate.

The die assembly of the present invention comprises the die described above and also a die cone attached to the central portion of the extruder face of the die plate, the die cone covering and enclosing the inner annular groove but not the extrusion orifices. Also, an adaptor for attaching the die plate to the extruder may be attached to the die plate, the adaptor when bolted to the die plate covering the outer annular groove but not the extrusion orifices. In another embodiment, the die assembly can further comprise a circular flange attached to the cutting face of the die plate, the flange allowing said die plate to be attached to said water chamber, a circular cap attached to the cutting face of said die plate, and thermally-insulative gaskets fitted between the die plate and both the flange and cap.

In yet another embodiment of the invention, a die plate is provided having a plurality of coiled heaters.

BRIEF DESCRIPTION OF DRAWINGS

In the accompanying drawings which illustrate specific embodiments of the invention, but which should not be construed as restricting the spirit or scope of the invention in any way.

DESCRIPTION

Figure 2:
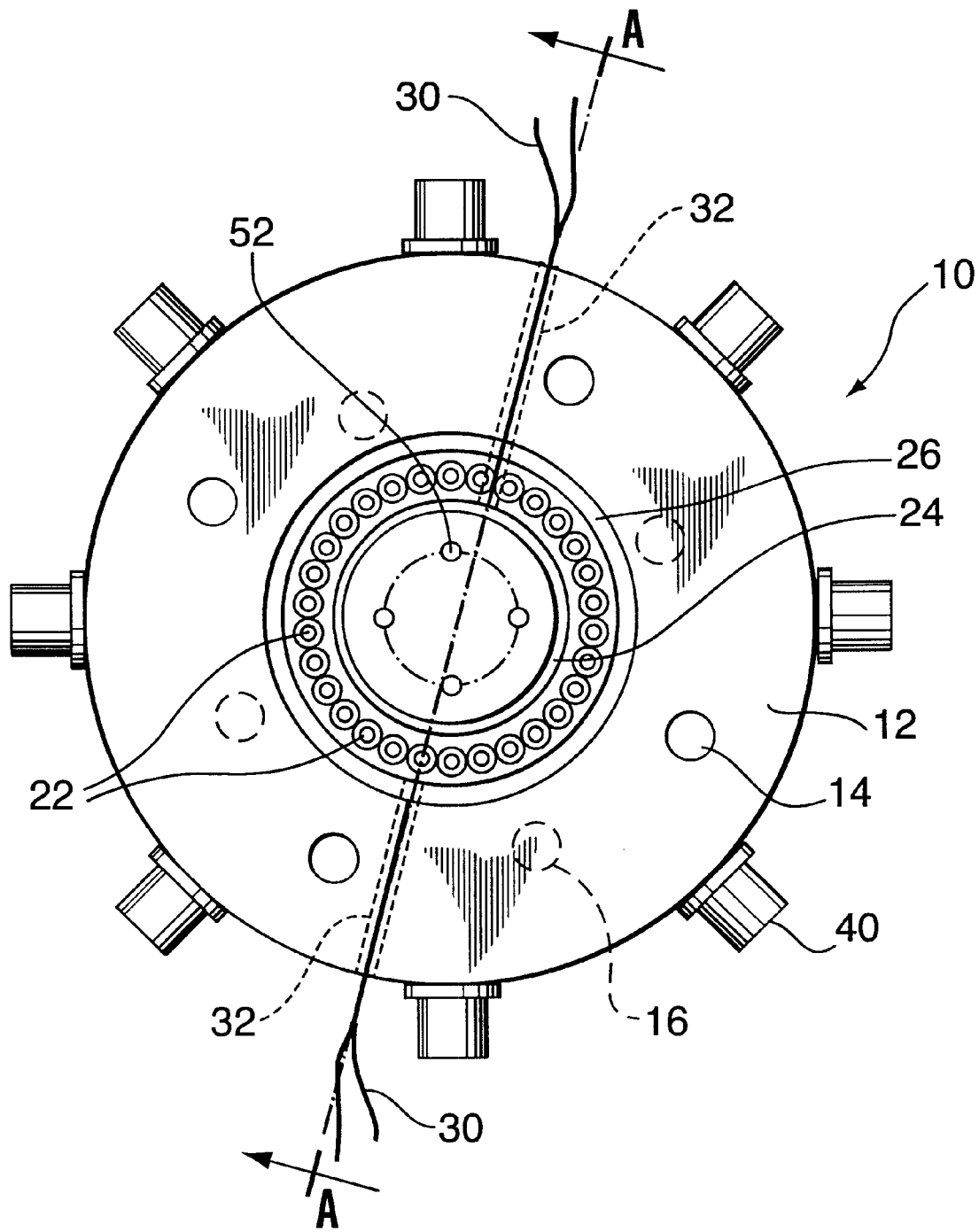
FIG. 2 is a front view of the extrusion die of the die assembly illustrated in FIG. 1.

Referring first to FIG. 2, an extrusion die made in accordance with one embodiment of the invention, denoted generally by the numeral 10, comprises a disc-shaped die plate 12 having an extruder face 18 (FIG. 3) which faces an extruder when the die is in place in an underwater pelletizer, and a cutting face 20 on the opposite side of die plate 12. Die plate 12 may be made of any suitable material, but is typically made of steel.

Die plate 12 may have bolt holes 14 for mounting plate 12 to an extruder (not shown), or an adapter (as discussed below), and may also have bolt holes 16 for mounting plate 12 onto the water chamber or a suitable adaptor (also discussed below) of an underwater pelletizer.

A plurality of extrusion orifices 22 extend through die plate 12 from extruder face 18 to cutting face 20. One such extrusion orifice 22 is shown in cross-sectional detail in FIG. 3. As is known in the art, orifice 22 may be tapered, as shown, to assist molten polymer material in passing therethrough.

Orifices 22 may be arranged in any suitable pattern, but as shown in FIG. 2, the plurality of orifices 22 may be arranged in a circular pattern or "ring" about the central axis of die plate 12, in a manner well known in the art. In one embodiment of the invention, however, the ring of orifices 22 is slightly offset from the central axis of die plate 12, allowing the cutting knives (not shown) of a pelletizer, which are typically arranged coaxially with the die 10, to cut each strand of material which passes through orifices 22 at a slightly different point along their respective blade lengths, thereby reducing knife wear.

Figure 3:
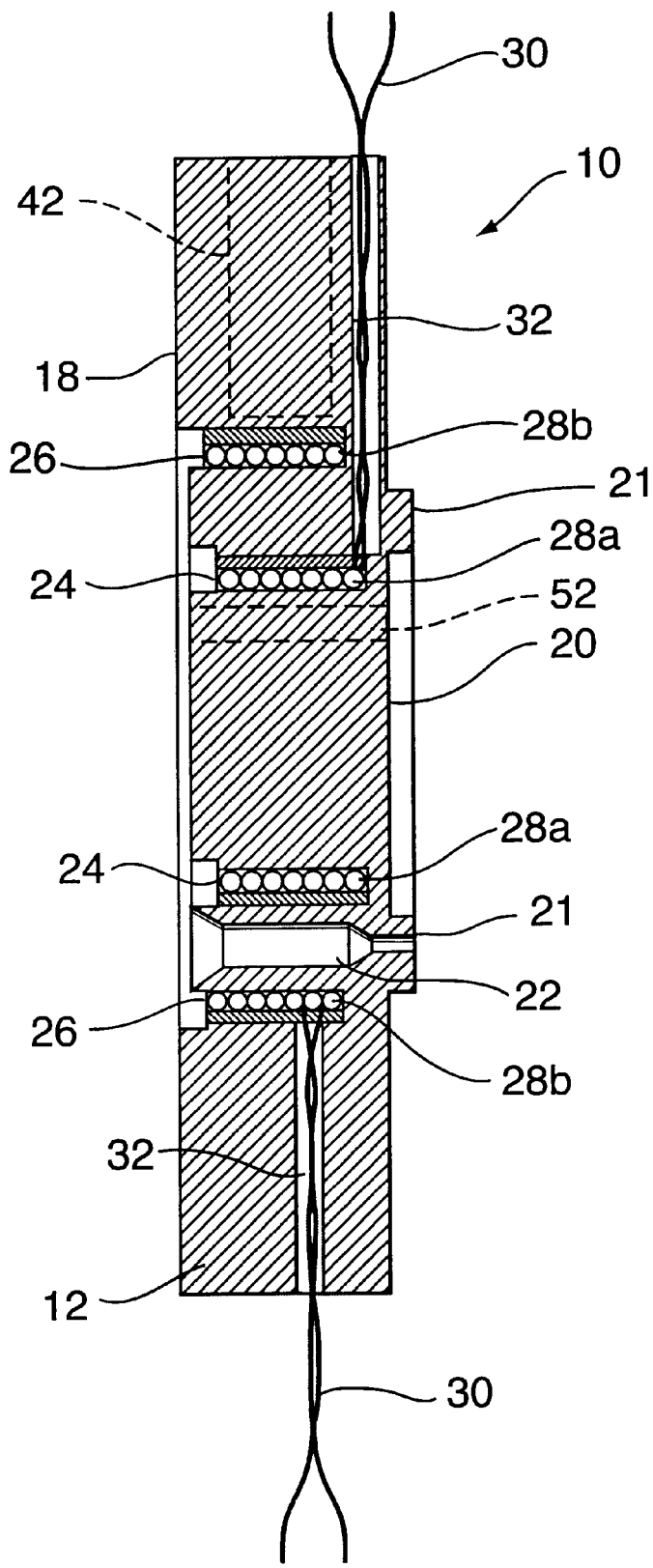
FIG. 3 is a cross-sectional view of the extrusion die illustrated in FIG. 2, taken along line A—A.

In the preferred embodiment of the invention, the ring of orifices 22 is surrounded by an inwardly adjacent annular groove 24 formed in one face of the die plate, preferably the extruder face 18, and an outwardly adjacent annular groove 26 formed in a face of the die plate, also preferably extruder face 18. Annular grooves 24, 26 preferably extend nearly the entire width of die plate 12, as shown in FIG. 3. Grooves 24, 26 are preferably coaxial with the ring of orifices 22, but need not be.

Contained within each of the grooves 24, 26 is a heater. In a preferred embodiment of the invention, coiled heating elements 28a, 28b (FIG. 3) are employed. Heating elements 28a, 28b are conveniently made of a coil of an electrically resistive metallic material such that they become hot when electric current is passed through them.

Electrical leads 30 are attached to heating elements 28a, 28b, and extend outwardly from grooves 24, 26 to the exterior of die plate 12 through chambers 32 formed therein. Leads 30 are attached to an electrical source which provides enough current to suitably heat heating elements 28a, 28b. It will be appreciated, given this description, that when heated, heating elements 28a, 28b provide heat to the ring of orifices 22, both on the inside of the ring, and also on the outside of the ring, thereby maintaining an almost-uniform amount of heat around the entirety of each of orifices 22. This allows polymer material passing through each of orifices 22 to remain molten until it has exited the orifice.

Heating elements 28a, 28b may be made of a wire material which expands when heated, and if so, it is desirable to fill grooves 24, 26 with a thermally-conductive paste so that heat from heating elements 28a, 28b may be properly conducted to orifices 22 no matter how much the wire of elements 28a, 28b has expanded. The paste may be conveniently introduced into grooves 24, 26 under pressure through grease nipples communicating with the grooves, or through other chambers (not shown) specifically fashioned for this purpose.

Although heating elements 28a, 28b may be suitable in and of themselves to properly heat orifices 22, another embodiment of the invention additionally employs a plurality of electrical heating rods 40 placed in chambers 42 (one is shown in dotted outline in FIG. 3) arranged radially in die plate 12, the chambers 42 extending inwardly from the circumference of die plate 12, as known in the art. However, unlike heating rods used in prior art dies, the rods of the present invention are preferably formed such that the heating element of each rod is concentrated near the bottom of the rod and the normally concave bottom is filled with copper to direct most of the rod's heat through its end and towards the die hole pattern rather than to the rest of the die plate 12.

Figure 1:
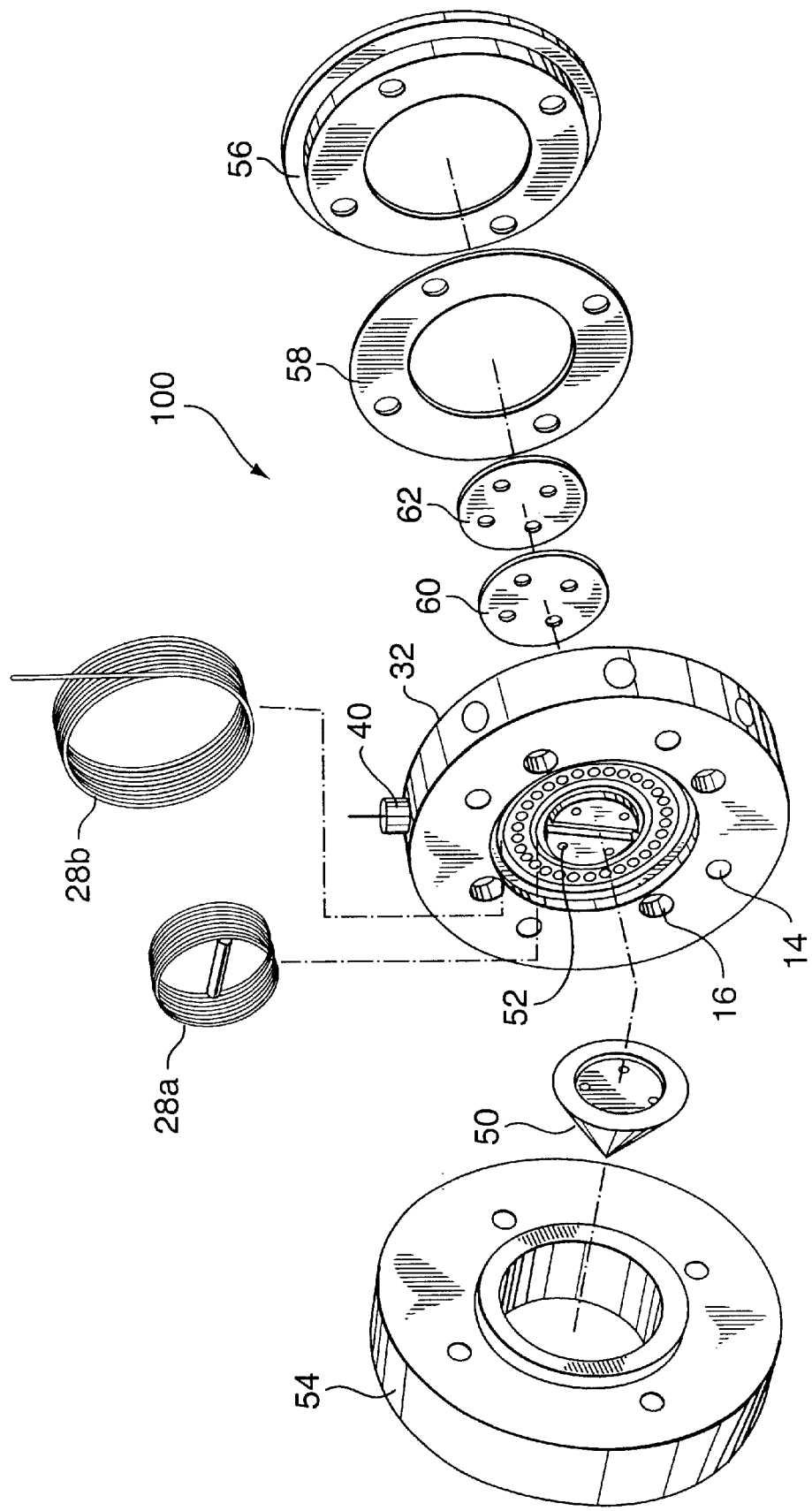
FIG. 1 is an exploded perspective view of an extrusion die assembly made in accordance with one embodiment of the invention.

To further improve the die's heat retention capabilities for the purpose of improved polymer flow, the die 10 of the present invention may be combined with other elements which essentially serve as thermal barriers to form a die assembly as shown in FIG. 1, which is denoted generally herein 100.

In typical underwater pelletizing systems, there are a number of different arrangements of extruders, and adaptors are commonly bolted between an extruder and the extrusion die of choice. On the "upstream" side of die 10, die assembly 100 of the present invention has such an adaptor, labelled 54 in FIG. 1, which may be bolted between the die 10 described above and an extruder.

Die assembly 100 of the present invention also has a die cone 50 attached to the extruder face 18 of die plate 12 to better direct molten thermoplastic material from the extruder directly to orifices 22. Die cone 50 may be attached with bolts extending through cone bolt holes 52 (FIG. 2) in die plate 12. A bolt hole 52 is shown in dotted outline in FIG. 3.

Figure 4:
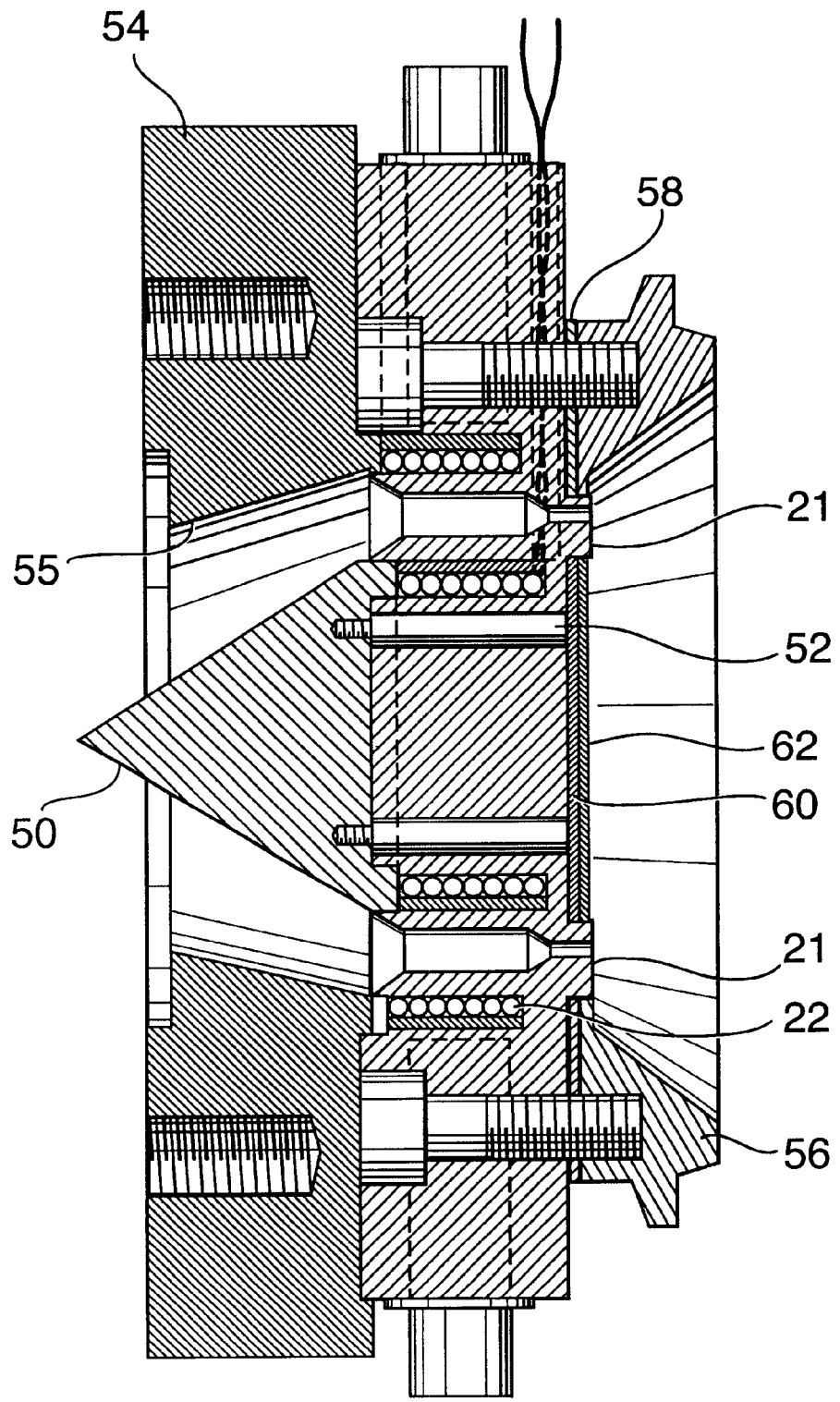
FIG. 4 is a cross-sectional view of the die assembly shown in FIG. 1.

What is unique about this aspect of the present invention is that the base of die cone 50 of die assembly 100 is just large enough that it covers almost the entire surface area of the extruder face 18 inwards of the inside edge of the ring of orifices 22, as shown in FIG. 4. Die cone 50, accordingly, covers and encloses inner groove 24, thereby keeping polymer material out of groove 24, and tending also to moderate temperature fluctuations in the immediate area adjacent inner groove 24.

Further, as shown in FIG. 4, adaptor 54 may be fashioned to have tapered inner surfaces 55 which also serve to direct molten material directly to orifices 22. Adaptor 54 thereby covers the surface area of die plate 12 outward of the ring of orifices 22, and in particular, encloses outer groove 26, similarly moderating temperature in this area of die plate 12.

This combination of die plate 12, cone 50 and adaptor 54 serves to present only a small surface area of extruder face 18 to molten material extruded by the extruder to which adaptor 54 is bolted; specifically, only the area presenting the upstream ends of orifices 22. This tends to moderate the temperature in the die 10.

On the "downstream" side of die 10, a circular flange 56 may be bolted to die plate 12 and may serve to allow die plate 12 to be attached to a water chamber in an underwater pelletizer in a quick-disconnect system. A thermally non-conductive gasket 58 may be inserted between die plate 12 and flange 56, thereby thermally shielding the outermost portion of die plate 12 from the cold water passing by die plate 12 when it is in use.

Further, a thermally-non-conductive gasket 60 and cap 62 may be attached to the inner portion of die plate 12, thermally shielding the central portion of die plate 12 from the cold water.

Similar to the arrangement of die cone 50 and adaptor 54 on the upstream side of die plate 12, cap 62 and flange 56 may be of such diameters as to allow only a small surface area forming a raised cutting surface 21 of the cutting face 20 of die plate 12 to be presented to the cold water of the water chamber of the pelletizer. Specifically, only the portion of the cutting face presenting the downstream end of orifices 22 may be exposed directly to the water in the water chamber.

In a preferred embodiment, flange 56 and cap 62 are made from a material of lower thermal conductivity than tool or mild steel, such as stainless steel.

Figure 5:
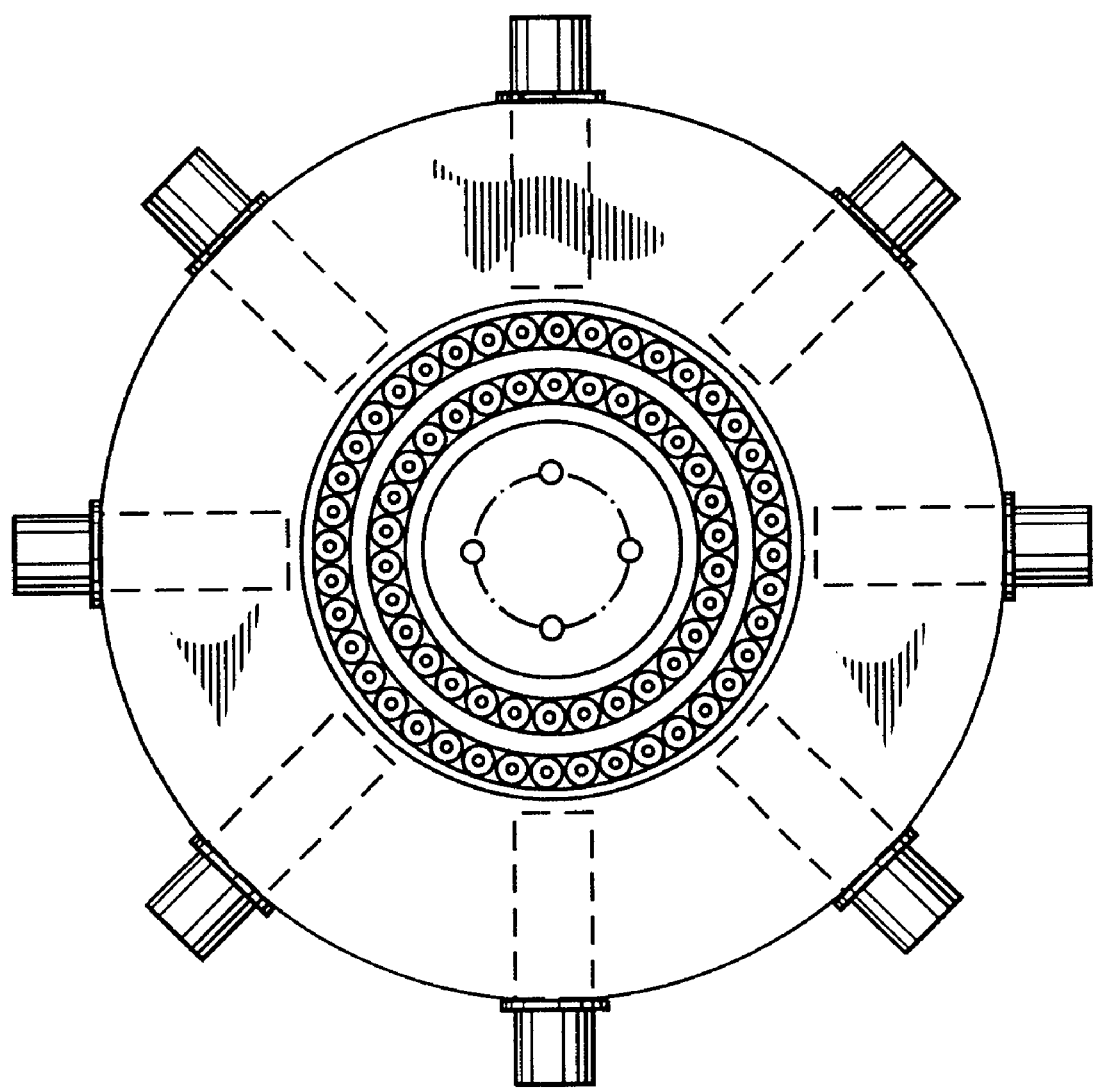
FIG. 5 is a front view of another extrusion die made in accordance with the invention.

As will be apparent to those skilled in the art in the light of the foregoing disclosure, many alterations and modifications are possible in the practice of this invention without departing from the spirit or scope thereof. For example, as shown in FIG. 5, this invention is not limited to dies having only one ring of extrusion orifices, and 2 heater elements. Rather, this invention also encompasses dies and die assemblies having a plurality of orifice rings, each having an inner and outer heating element, as shown in FIG. 5. Accordingly, the scope of the invention is to be construed in accordance with the substance defined by the following claims.

What is claimed is:

1. An extrusion die assembly for use in an underwater pelletizer having an extruder and a water chamber, said die assembly comprising:
   a) a die plate having an upstream extruder face and a downstream cutting face;
   b) an inner annular groove formed in one face of said die plate;
   c) an outer annular groove formed in one face of said die plate;
   d) a plurality of spaced-apart extrusion orifices extending through said die plate from said extruder face to said cutting face, said orifices arranged in a pattern occupying a space between said inner and outer annular grooves;
   e) a coiled heating element conned within each of said inner and outer annular grooves, said coiled hearing elements having leads extending outwardly from said die plate for connection to an electrical source; and
   f) a die cone attached to the central portion of said extruder face of said die plate, said die cone covering and enclosing said inner annular groove but not said extrusion orifices.

2. The extrusion die assembly as claimed in claim 1, wherein said pattern of extrusion orifices is a circular pattern, and wherein said inner and outer annular grooves and said circular pattern of extrusion orifices are all concentric.

3. The extrusion die assembly as claimed in claim 2, wherein said inner and outer annular grooves and said circular pattern of extrusion orifices are all coaxial with the central axis of said die plate.

4. The extrusion die assembly as claimed in claim 3, wherein a thermally-conductive paste is contained within each of said inner and outer annular grooves, occupying the volume not occupied by said heating coils.

5. The extrusion die assembly as claimed in claim 4 further comprising mounting holes bored through said die plate for mounting said die onto said extruder and onto said water chamber in an underwater pelletizer.

6. The extrusion die assembly as claimed in claim 5 further comprising a plurality of electrical heating rods occupying chambers arranged radially in said die plate, said chambers extending inwardly from the circumference of said die plate.

7. The extrusion die assembly as claimed in claim 6 wherein each of said heating rods comprises a heating element concentrated near the bottom of said rod, and wherein the bottom portion. of each of said rods is made at least in part from copper.

8. The extrusion die assembly as claimed in claim 1, said assembly further comprising an adaptor for attaching said die plate to said extruder, said adaptor when bolted to said die plate coveting said outer annular groove but not said extrusion orifices, wherein said die plate, having said die cone and said adaptor attached thereto, presents the portion of said extruder face to said extruder which bears said orifices.

9. The die assembly claimed in claim 8, further comprising:
   a) a circular flange attached to said cutting face of said die plate, said flange allowing said die plate to be attached to said water chamber; and
   b) a thermally-insulative gasket fitted between said die plate and said flange,
   wherein said flange and said gasket cover all or more of the portion of said die plate outward of said orifices.

10. The die assembly claimed in claim 9, further comprising:
    a) a circular cap attached to said cutting face of said die plate; and
    b) a thermally-insulative gasket fitted between said die plate and said cap,
    wherein said cap and said gasket cover all or most of the portion of said die plate of said orifices.

11. An extrusion die assembly for use in an underwater pelletizer having an extruder, said die assembly comprising:
    a) a die plate having an upstream extruder face and a downstream cutting face;
    b) a plurality of rings of spaced-apart extrusion orifices extending through said die plate from said extruder face to said cutting face; and
    c) a plurality of grooves formed in one face of said die plate, each of said grooves occupying a space adjacent one of said rings of said extrusion orifices;
    d) a coiled heating element contained within each of said grooves, said coiled heating elements having leads extending outwardly from said die plate for connection to an electrical source;

e) a die cone attached to the central portion of said extruder face of said die plate, said die cone covering and enclosing at least one of said plurality of grooves, but not said extrusion orifices; and f) an adaptor for attaching said die plate to said extruder, said adaptor when bolted to said die plate covering at least one of said plurality of grooves, but not said extrusion orifices, wherein said die plate, having said die cone and said adaptor attached thereto, presents the portion of said extruder face to said extruder which bears said orifices.

* * * * *